United States Patent [19]

Richey

[11] Patent Number: 5,208,837
[45] Date of Patent: May 4, 1993

[54] STATIONARY INTERFERENCE CANCELLOR

[75] Inventor: Manuel F. Richey, Paola, Kans.

[73] Assignee: Allied-Signal Inc., Morris Township, Morris County, N.J.

[21] Appl. No.: 576,035

[22] Filed: Aug. 31, 1990

[51] Int. Cl.$^5$ .............................................. H04B 1/10
[52] U.S. Cl. .................................... 375/103; 381/103; 375/99
[58] Field of Search ................... 375/102, 103, 14, 80, 375/99, 98, 58, 11, 12; 328/167; 455/303; 333/18, 28 R; 364/724.01, 724.02; 381/103; 329/350

[56] References Cited

U.S. PATENT DOCUMENTS 4,571,732 2/1986 Pirani et al. ............................ 375/14
4,649,505 3/1987 Zinser, Jr. et al. .............. 375/103 X
5,001,727 3/1991 McDavid .............................. 375/80

Primary Examiner—Curtis Kuntz
Assistant Examiner—Tesfaldet Bocure
Attorney, Agent, or Firm—Donald B. Paschburg; Howard G. Massung

[57] ABSTRACT

A stationary interference cancellor utilizes a programmable digital signal processor with cancelling software to provide the required combinations of time delay and filtering to perform interference cancelling. The digital signal processor continually analyzes the information spectrum and builds cancellation filters around stationary undesirable signals. By reducing the size of the delay and by adding an FIR shaping filter and automatic gain control at the output of the circuitry, interference cancelling performance is greatly improved.

11 Claims, 3 Drawing Sheets

STATIONARY INTERFERENCE CANCELLOR

BACKGROUND OF THE INVENTION

1. Field of the Invention

The present invention is related to communication systems and more specifically to reducing interference while communicating.

2. Description of the Prior Art

In any electronic circuit there is a certain amount of interference which must be controlled. This interference can be any electrical or electromagnetic disturbance, phenomena, signal, or emission, man-made or natural, which causes or can cause an undesired response, malfunctioning, or degradation of the electrical performance of electrical equipment. To reduce or eliminate this interference there are several prior art techniques. One such technique is discussed in *Adaptive Signal Processing*, Widrow, B. and Stearns, S., Prentice-Hall, Inc., Englewood Cliffs, N.J. on pages 349 and 350. Here, examples are given where a broadband signal is corrupted by periodic interference and no external reference input, free of the original signal, is available. These examples include the playback of speech or music in the presence of tape hum or turntable rumble or sensing seismic signals in the presence of vehicle engine or powerline noise.

As described in this prior art publication, periodic interference is cancelled by inserting a fixed delay into a reference input which is drawn directly from the primary input. This fixed delay may be inserted in the primary instead of the reference input if its total length is greater than the total delay of the adaptive filter. Otherwise, the adaptive filter will converge to match it and cancel both signal and interference. The fixed delay chosen must be of sufficient length to cause the broadband signal components in the reference input to become decorrelated from those in the primary input. The interference components, because of their periodic nature, will remain correlated with each other.

The deficiencies with the above approach and other similar approaches of the prior art relate to the size of the delay inserted in the reference input or primary input and the overall performance of the interference cancellor circuit.

SUMMARY OF THE INVENTION

In accordance with the present invention a stationary interference cancellor is provided which attenuates various forms of stationary interference such as modems, tones, etc. while passing along various analog signals. A programmable digital signal processor is utilized with cancelling software to provide the required combinations of time delay and filtering to perform the stationary interference cancelling. The digital signal processor continually analyzes the information spectrum and builds cancellation filters around stationary, undesirable signals.

DETAILED DESCRIPTION OF THE INVENTION

In accordance with the present invention a stationary interference cancellor is provided which utilizes a programmable digital signal processor and cancelling software to suppress power line interference, tones, carriers, some types of jamming, teletype, and digital modem noise while passing signals that change at a syllabic rate (such as analog voice).

Figure 1:
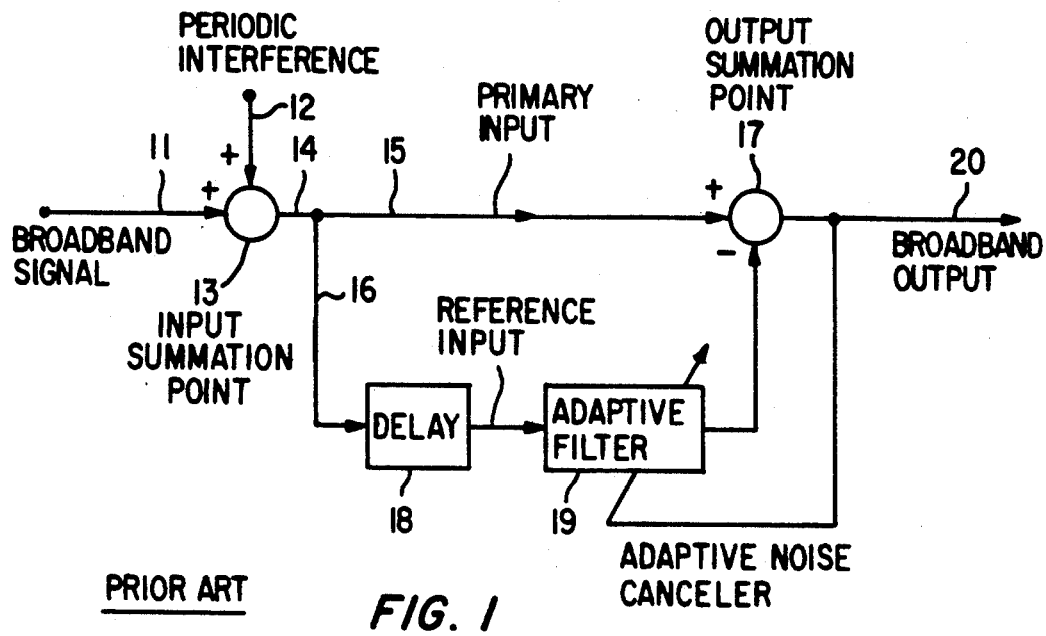
FIG. 1 illustrates a block diagram of a prior art technique for cancelling interference.

Turning to FIG. 1 of the drawings we have a block diagram of a prior art technique for cancelling interference. This technique, as with the present invention, provides a method for cancelling periodic interference without utilizing an external reference source. An external source is usually required for adaptive filtering because the adaptive filter adjusts itself to make its input signal look as much like the reference signal as possible. As can be seen from the drawing, broadband signal input 11 and periodic interference input 12 are combined by input summation point 13. From here the summation signal 14 splits into a Primary input 15 or a reference input 16. Primary input 15 flows directly to an output summation point 17 while reference input 16 flows to a delay 18. By inserting fixed delay 18 into reference input 16 drawn directly from primary input 15 the periodic interference can in many cases be readily cancelled. The fixed delay may be inserted in primary input 15 instead of reference input 16 if its total length is greater than the total delay of adaptive filter 19. Otherwise, adaptive filter 19 will converge to match it and cancel both signal and interference. Delay 18 must be chosen to be of sufficient length to cause the broadband signal components in reference input 16 to become decorrelated from those in primary input 15. The interference components, because of their periodic nature, will remain correlated with each other. After reference input 16 passes delay 18 and adaptive filter 19 the signal is combined with primary input 15 at output summation point 17 This combined signal is illustrated in FIG. 1 as broadband output 20. The adaptive filter attempts to duplicate the predictable component of the primary input and the summation point removes this predictable component. In theory, this leaves the unpredictable component at the output.

Figure 2:
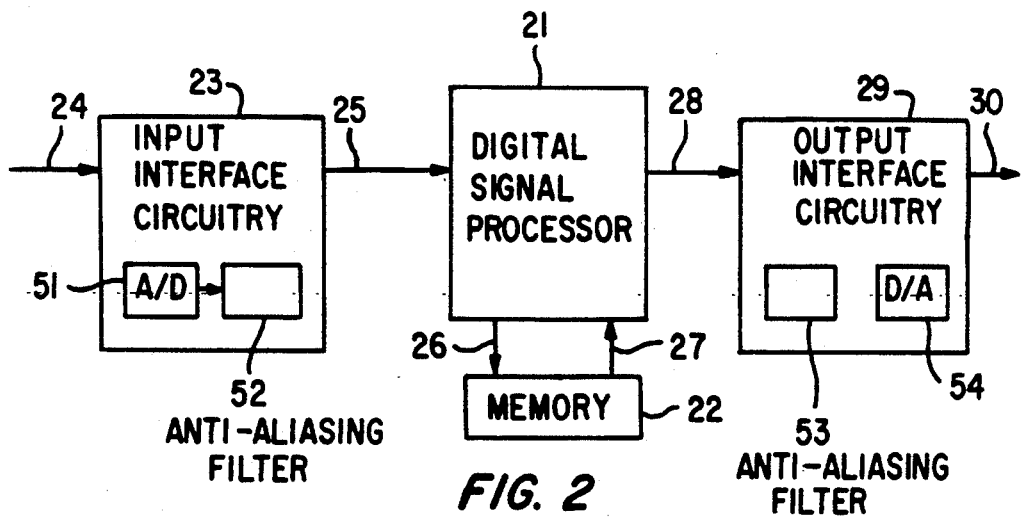
FIG. 2 illustrates a hardware block diagram of the present invention.

Turning now to FIG. 2 of the drawings, we have a hardware block diagram of the stationary interference cancellor of the present invention. The main component of the hardware of the stationary interference cancellor is the programmable digital signal processor (DSP) 21. Also shown in FIG. 2 is memory 22 and interface circuitry 23. As can be seen from FIG. 2 a single analog input enters on input line 24 into input interface circuitry 23. Input interface circuitry 23 having analog to digital converter 51 and anti-aliasing filter 52 can be an ATT 7522 codec or any similar device having analog to digital and digital to analog converters as well as anti-aliasing filters. In this example, input interface circuitry 23 has a sample rate of approximately 8 KHZ. From input interface circuitry 23 the signal follows, in a serial manner, line 25 which connects input interface circuitry 23 with digital signal processor 21. Digital signal processor 21 which may be an ATT DSP 32 C or any similar device also interfaces with memory 22 through address line 26 and data line 27 in a manner which is known by one skilled in the art. Digital signal processor 21 with memory 22 performs software processing as discussed below. Memory 22 in this example is a 4K×32 EEPROM. After software processing, an output from digital signal processor 21 follows, in a serial manner, output line 28. Output line 28 connects digital signal processor 21 with output interface circuitry 29 having anti-aliasing filter 53 and digital to analog converter 54. After output interface circuitry 29, the processed signal flows out of the stationary interference cancellor on analog output line 30. Analog output line 30 contains a signal having its interference attenuated.

Figure 3:
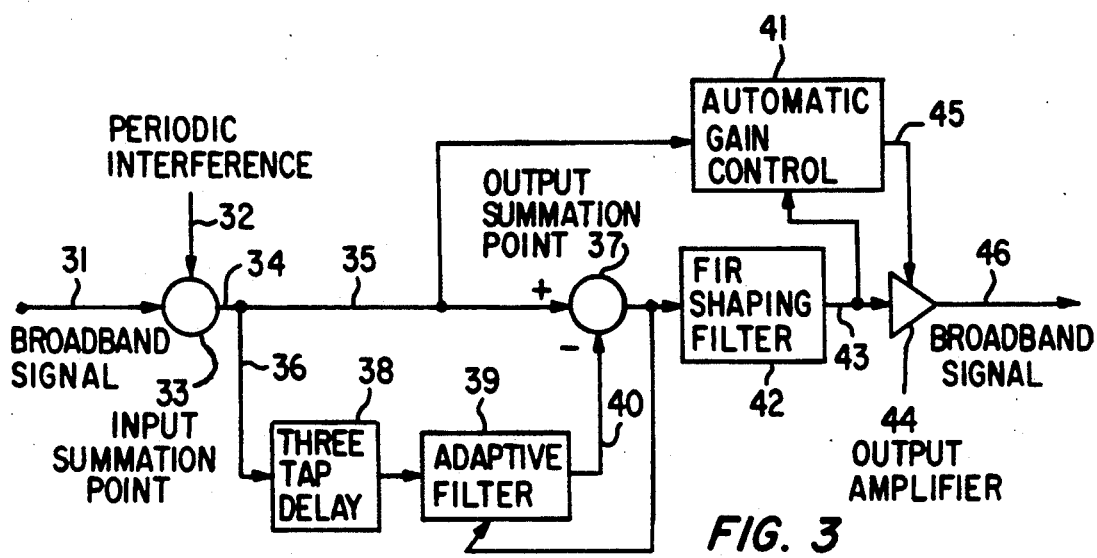
FIG. 3 illustrates a block diagram of the technique utilized by the present invention.

FIG. 3 illustrates a block diagram of the technique utilized by the present invention. Similar to FIG. 1 (prior art) we have broadband signal 31 and periodic interference 32 entering input summation point 33. The combined signal 34 splits to a primary input 35 and a reference input 36. Reference input 36 flows into a three tap delay 38 and then into a Least Mean Squares (LMS) adaptive filter 39 having a length equal to 32 taps and a coefficient of adaptivity (u) equal to $0.5 \times 10^{-10}$. After LMS adaptive filter 39, the filtered signal 40 flows into output summation point 37. Primary input 35 splits and flows into automatic gain control 41 and output summation point 37. At output summation point 37, primary input 35 meets filtered signal 40 from LMS adaptive filter 39. Here the signals are combined and flow into a Finite Impulse Response (FIR) digital shaping filter 42. FIR shaping filter output 43 is fed into the AGC 41 and also enters output amplifier 44. A control output 45 from automatic gain control 41 is used to set the gain of output amplifier 44, then outputs a broadband signal 46 which has reduced or eliminated interference.

The present invention provides an improvement over the prior art because of the reduced size of the delay and the improved performance caused by the addition of the FIR shaping filter and automatic gain control at the output of the circuitry. The three tap delay 38 does not have the restriction of having a total length which is greater than the total delay of the adaptive filter 39. A grave limitation of the prior art system for voice communications is that a delayed voice is added to the original at summation point 17 creating an echo. With a delay of only three taps, this echo is greatly reduced and essentially unnoticable.

The second major improvement of the present invention, the addition of the FIR shaping filter and automatic gain control at the output of the interference cancellor circuitry help to make the voice sound more natural. It has long been known that voice audio does not have a flat spectrum but rather tends to fall off in frequency after 600–800 Hz. The prior art cancellor algorithm tends to equalize all frequency components in the band thus attenuating the low frequency components (less than 800 Hz.) and amplifying the high frequency components. The shaping filter performs a function similar to deemphasis in FM systems by reversing this process.

Figure 4:
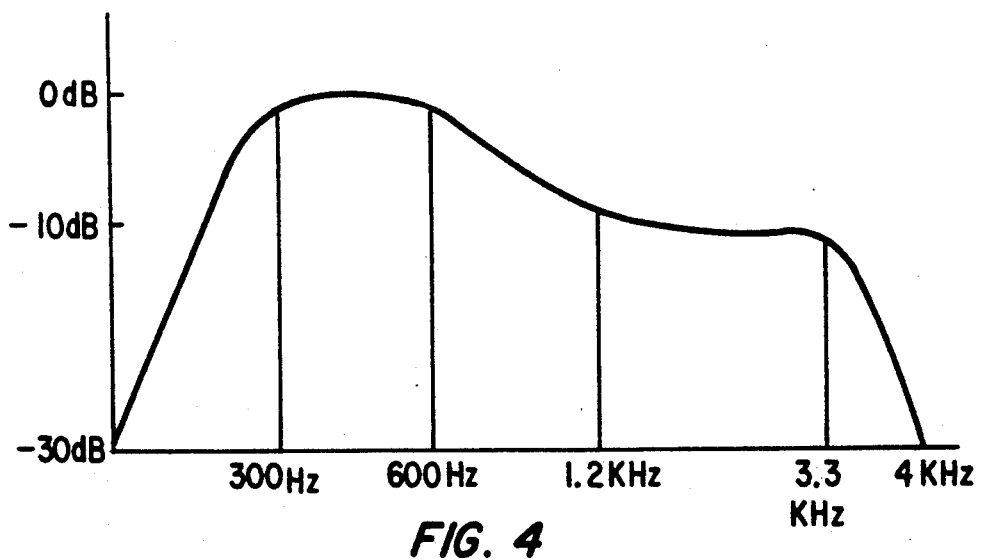
FIG. 4 illustrates characteristics of a FIR shaping filter utilized in one embodiment of the present invention.

The characteristics of the FIR shaping filter of one embodiment of the present invention are illustrated in FIG. 4. The automatic gain control algorithm is necessary in post-audio processing to maintain the output volume at a constant level.

Another major improvement of the present invention is found in the fact that the adaptive filter coefficients are reset to zero whenever the frequency is changed. This allows the interference cancellor to work even with a frequency hopping radio. In this mode of operation, the cancellor has been determined to reduce the amount of hop noise present in the audio output of a hopping radio. Hop noise is the phenomenon of hopping into an occupied or noisy band and then hopping out of it. For that particular hop duration, a loud screech or tone interrupts the audio. The interference cancellor of the present invention reduces the intensity of most hop noise.

The following is a description of a software flow diagram that describes one embodiment of interference cancellation software. This diagram is shown in FIG. 5 and all references to decision diamonds and Processing boxes refer to FIG. 5 unless otherwise specified.

After Start 51 the program flows to Processing Box 1,52 where after program reset, the arrays "p" and "pd" are initialized to all zeroes. Array "p" holds the pipeline data for the adaptive filter. Array pd holds the pipeline data for the FIR shaping filter. Processing Box 2,53 resets the AGC timing parameters. The gain of the output amplifier and the input and output average power values ("gain", "vin" and "vout") are all set to 1.0. The variable "time" is set to zero and "a" (the AGC integration constant) is set to 0.001. In Processing Box 3,54 the array holding the adaptive filter coefficients "w", is initialized to contain all zeroes. Decision Diamond 1,55 and Processing Box 4,56 are used to determine when a real time data sample is available from the A/D converter, converts it from fixed to floating point, and then stores it in the variable "sample" (signals 34, 35 and 36 of FIG. 3). Real time samples are generated by the A/D converter at a 8000 Hz. rate. In Processing Box 5,57 the pipeline data (array "p") for the adaptive filter is rotated. In Processing Box 6,58, the data sample rotates through a three tap delay line (time delay) (array "sd" and item 38 in FIG. 3) and stores the output of the delay line in the last location of array "p". It is essential that this time delay be short because it will produce an undesireable echo of the voice if it is too long. Also, a short time delay saves memory storage space. The absolute value of the array sample is then used to calculate the average input power "vin". Processing Box 7,59 calculates the output of the adaptive filter ("1sout" or signal 40 in FIG. 3) by multiplying and accumulating the pipeline data with the filter coefficients. The adaptive filter is shown as item 39 in FIG. 3. Processing Box 8,60 calculates the error signal generated by item 37 in FIG. 3. This error signal is used to adjust the adaptive filter coefficients. In Processing Box 9,61, the previously calculated error signal is used to update the coefficients "w" of the adaptive filter in this box. The mu-lms algorithm with $mu = 0.5 \times 10^{-10}$ is used for updating the coefficients. In Processing Box 10,62 the data pipeline (array "pd") of the FIR shaping filter is rotated in this box. In Processing Box 11,63 the error output is shifted into the last position in this pipeline in this box and the accumulation variable "firout" is set to zero. Processing Box 12,64 calculates the output of the FIR shaping filter ("firout" or signal 43 in FIG. 3) by multiplying and accumulating the pipeline data (array "pd" ) with the filter coefficients (array "pf"). FIR shaping filter restores the natural sound of a typical voice. This filter is shown as item 42 in FIG. 3. Processing Box 13,65 implements the AGC stage that follows the FIR filter. It calculates first the average output power "vout", and then the gain. Finally, it multiplies the gain by the FIR filter output to give a final output "sumout" (signal 46 in FIG. 3). Processing Box 14,66 increments the "time" variable until one second has passed. Then it sets the AGC integration constant "a" to one-tenth of its original value. Processing Box 15,67 converts the final output "sumout" from floating point to fixed point format and sends it to the D/A converter. At Decision Diamond 2,68 the algorithm checks to determine if the radio's operational frequency has changed. If the frequency has changed, then the algorithm restarts at ENTRY POINT A. This allows the adaptive filter coefficients to be reset to zero and the AGC parameters to be reset before further samples are processed. This feature allows the interference cancellor to be useful for cancelling hop noise in frequency hopping systems. If the frequency has not changed then the algorithm continues at ENTRY POINT B and processes the next sample without resetting the adaptive filter coefficients or the AGC parameters.

Figure 5:
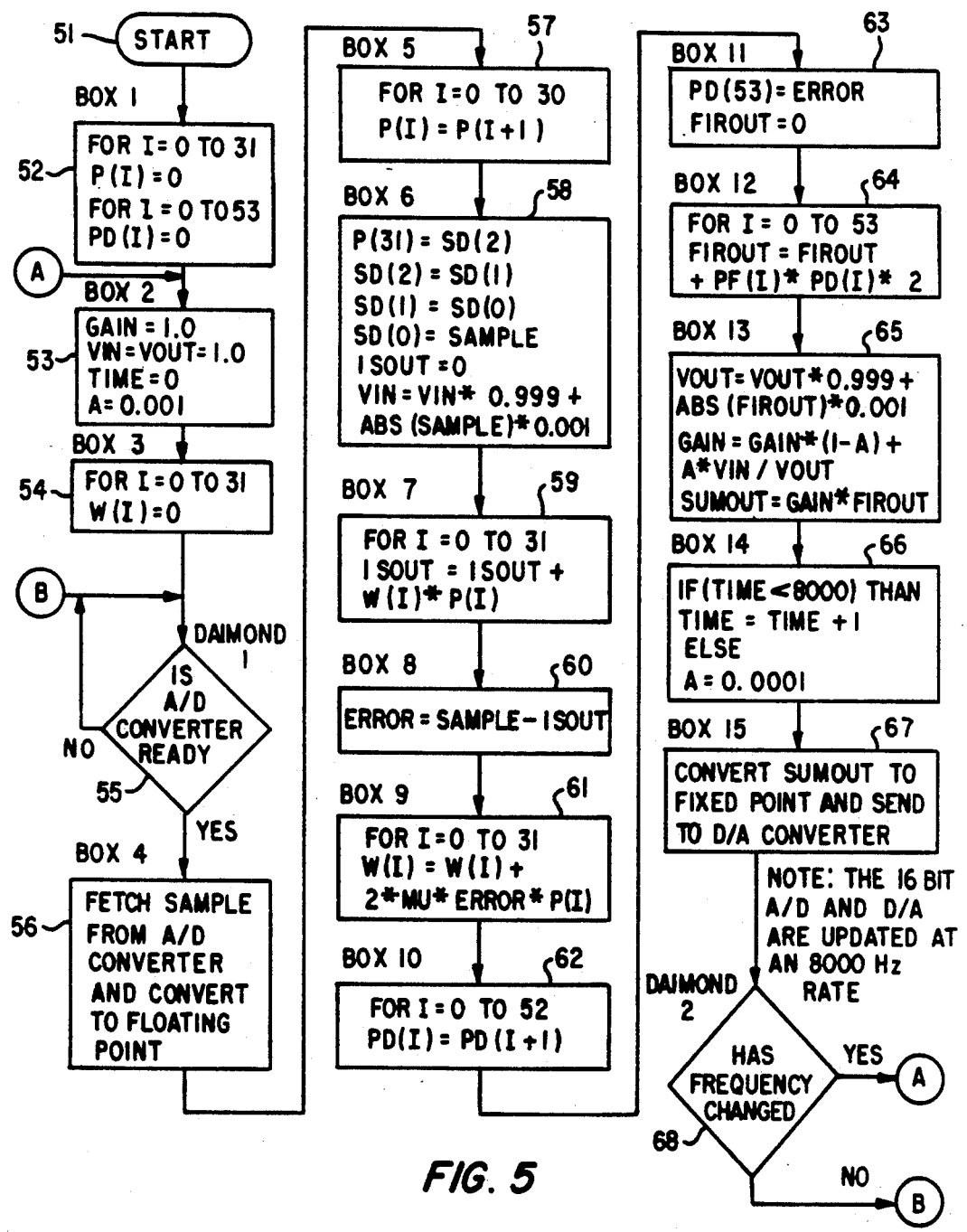
FIG. 5 illustrates a software flow diagram of the present invention.

The description of the variables utilized in FIG. 5 is as follows:

| | |
|---|---|
| i: | increment pointer. |
| p(0-31): | array holding pipeline data for adaptive filter. |
| pd(0-53): | array holding pipeline data for shaping FIR filter. |
| w(0—31): | array holding adaptive filter coefficients. |
| sample: | data input from A/D converter. |
| sd(0-2): | array holding delayed input from A/D converter. |
| lsout: | output from adaptive filter. |
| error: | difference between original sample and adaptive filter output. |
| mu: | coefficient of adaptivity. |
| sumout: | output to D/A converter. |
| pf(0-53): | array holding coefficients of shaping FIR filter. |
| vin: | average voltage level of incoming samples. |
| vout: | average voltage level of outgoing sample. |
| gain: | gain factor equalizing input and output signal levels. |
| firout: | output from shaping FIR filter. |
| a: | AGC integration constant. |
| time: | number of samples since frequency was changed. |
| abs( ): | absolute value function. |

The stationary interference cancellor of the present invention has numerous applications in electronic equipment, especially communication equipment. As one example, often while communicating over a HF channel, one encounters an AM carrier or a digital modem disrupting communications. The stationary interference cancellor of the present invention will remove those types of interference as well as the types of interference discussed earlier, therefore, allowing for a cleaner reception of audio.

It is not intended that this invention be limited to the hardware or software arrangement, or operational procedures shown disclosed. This invention includes all of the alterations and variations thereto as encompassed within the scope of the claims as follows.

I claim:

1. A stationary interference cancellor comprising:
    input interface circuitry means for receiving an analog audio input and for outputting a digital signal in a serial manner;
    digital signal processor means of receiving said digital signal, for providing required combinations of minimum time delay and filtering to perform stationary interference cancelling, and for outputting a processed digital signal in a serial manner;
    said filtering including a combination f adaptive filtering, FIR shaping filtering and automatic gain control;
    memory means for receiving and storing information from said digital signal processor means and for transmitting information to said digital signal processor means; and
    output interface circuitry means for receiving said processed digital signal from said digital signal processor means and for outputting an analog audio signal having its interference attenuated.

2. A stationary interference cancellor as claimed in claim 1 wherein said input interface circuitry means comprises:
    analog to digital converter means; and,
    anti-aliasing filter means, and said output interface circuitry means comprises:
    digital to analog converter means; and,
    anti-aliasing filter means.

3. A stationary interference cancellor as claimed in claim 1 wherein said output interface circuitry comprises:
    an ATT 7522 codec or similar device.

4. A stationary interference cancellor as claimed in claim 1 wherein said input interface circuitry means and said output interface circuitry means has a sample rate of approximately 8 KHZ.

5. A stationary interference cancellor as claimed in claim 1 wherein said digital signal processor means comprises:
    an ATT DSP 32 C or any similar device.

6. A stationary interference cancellor as claimed in claim 1 wherein said memory means comprises:
    a 4K×32 EEPROM.

7. A stationary interference cancellor as claimed in claim 1 including delay means which provides time delay of less than or equal to delay of adaptive filtering.

8. A stationary interference cancellor as claimed in claim 1 including delay means which provides time delay of three taps.

9. A stationary interference cancellor comprising:
    input summation means for receiving a broadband signal and a periodic interference and for transmitting a primary input and a reference input;
    three tap delay means for receiving said reference input and for transmitting a delayed reference input;
    least mean squares adaptive filter means for receiving said delayed reference input and for transmitting a filtered signal;
    output summation means for receiving said primary input and said filtered signal and for transmitting an output summation signal;
    finite impulse response digital shaping filter means for receiving said output summation signal and for transmitting a shaped filtered output;
    automatic gain control means for receiving said primary input and said shaped filtered output and for transmitting a control output; and,
    output amplifier means for receiving said shaped filtered output and said control output and for transmitting a broadband signal having reduced or eliminated interference.

10. A stationary interference cancellor as claimed in claim 9 wherein:

said least mean squares adaptive filter means has a length equal to 32 taps and a coefficient of adaptivity equal to $0.5 \times 10^{-10}$.

11. A method of cancelling stationary interference comprising the steps of:
   receiving a broadband audio signal;
   receiving a periodic interference;
   digitally processing said broadband signal and said periodic interference to provide combinations of minimum time delay and filtering;
   outputting a broadband output audio having its interference attenuated, said digitally processing including the steps of:
   resetting a program;
   initializing a plurality of arrays to contain all zeros;
   resetting automatic gain control timing parameters;
   initializing an array holding adaptive filter coefficients to contain all zeros;
   determining when a real time data sample is available from A/D converter;
   converting said real time data ample form fixed to floating point;
   storing said converted real time data sample;
   rotating pipeline data for adaptive filter;
   rotating said data sample through a three tap delay line;
   storing output of said three tap delay line;
   calculating output of said adaptive filter;
   calculating an error signal;
   using said error signal to update said adaptive filter coefficients;
   rotating data pipeline of an FIR shaping filter;
   shifting said error signal into a last position in said data pipeline;
   setting an accumulation variable to zero;
   calculating an output of said FIR shaping filter;
   implementing an automatic gain control stage that follows said FIR shaping filter;
   multiplying gain from said automatic gain control by said output of said FIR shaping filter to provide a final output "sumout";
   incrementing a time variable;
   converting said final output "sumout" from a floating point formal to a fixed point format;
   sending said converted final output to a D/A converter; and,
   checking to determine if radio's operational frequency has changed.

* * * * *